(12) United States Patent
Santra et al.

(10) Patent No.: US 7,722,954 B2
(45) Date of Patent: May 25, 2010

(54) GAS-GENERATING ADDITIVES HAVING IMPROVED SHELF LIVES FOR USE IN CEMENT COMPOSITIONS

(75) Inventors: Ashok K. Santra, Dunan, OK (US); Rita J. McKinley, Dunan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 12/277,850

(22) Filed: Nov. 25, 2008

(65) Prior Publication Data
US 2009/0071375 A1 Mar. 19, 2009

Related U.S. Application Data

(62) Division of application No. 11/153,087, filed on Jun. 15, 2005, now Pat. No. 7,473,313.

(51) Int. Cl.
*B32B 5/16* (2006.01)
(52) U.S. Cl. ............. 428/403; 428/407; 106/696; 106/724; 106/823
(58) Field of Classification Search ............. 428/403, 428/407; 106/696, 724, 823
See application file for complete search history.

(56) References Cited

U.S. PATENT DOCUMENTS

| | | | | |
|---|---|---|---|---|
| 4,058,405 A | * | 11/1977 | Snyder et al. | 106/641 |
| 4,266,889 A | * | 5/1981 | Rail et al. | 405/223 |
| 4,367,093 A | * | 1/1983 | Burkhalter et al. | 106/642 |
| 4,390,371 A | * | 6/1983 | Cornwell | 106/644 |
| 4,565,578 A | * | 1/1986 | Sutton et al. | 106/642 |
| 4,908,079 A | * | 3/1990 | Tasaki et al. | 149/2 |
| 4,964,917 A | * | 10/1990 | Bobrowski et al. | 106/804 |
| 5,427,617 A | * | 6/1995 | Bobrowski et al. | 106/802 |
| 5,965,264 A | * | 10/1999 | Barenberg et al. | 428/402 |
| 6,709,508 B2 | * | 3/2004 | Dietrich et al. | 106/724 |
| 7,163,580 B2 | * | 1/2007 | Minami | 106/404 |
| 7,485,674 B2 | * | 2/2009 | Takano | 523/204 |
| 2004/0151940 A1 | * | 8/2004 | Takano et al. | 428/650 |
| 2005/0204960 A1 | * | 9/2005 | Heathman et al. | 106/672 |

OTHER PUBLICATIONS

JP 2005134738 A (May 26, 2005) Hoshina et al. abstract only.*
JP 2004263056 A (Sep. 24, 2004) Hosomi et al. abstract only.*
JP 60004560 A (May 11, 1985) Toyo Aluminum KK Japan; abstract only.*

* cited by examiner

*Primary Examiner*—Paul Marcantoni
(74) *Attorney, Agent, or Firm*—Craig W. Roddy; McDermott, Will & Emery LLP

(57) ABSTRACT

According to various embodiments, gas-generating additives for use in a cement composition comprise: a gas-generating material at least partially coated with a mixture comprising a fatty acid ester of sorbitan, glycerol, or pentaerythritol and having a shelf life of about 12 months or greater. The gas-generating additives may also include a $C_8$-$C_{18}$ hydrocarbon. In more embodiments, cement compositions comprise: a gas-generating material at least partially coated with a mixture comprising a fatty acid ester of sorbitan, glycerol, or pentaerythritol and a $C_8$-$C_{18}$ hydrocarbon for increasing a shelf life of the gas-generating material. In yet more embodiments, cement compositions comprise: a cement; a fluid for making the cement composition pumpable; a hydrogen-generating material at least partially coated with a mixture for delaying a hydrogen-generating reaction, the mixture comprising sorbitan monooleate and an isoparaffin.

18 Claims, 1 Drawing Sheet

GAS-GENERATING ADDITIVES HAVING IMPROVED SHELF LIVES FOR USE IN CEMENT COMPOSITIONS

CROSS-REFERENCE TO RELATED APPLICATION

This application is a divisional patent application of U.S. patent application Ser. No. 11/153,087 entitled "Gas-Generating Additives Having Improved Shelf Lives for Use in Cement Compositions," filed on Jun. 15, 2005 now U.S. Pat. No. 7,473,313, the entire disclosure of which is incorporated herein by reference.

BACKGROUND

The present invention generally relates to cementing, and more particularly to additives for use in cement compositions that have improved shelf lives, wherein the additives are initially formed to comprise a gas-generating material at least partially encapsulated with a coating comprising a fatty acid ester of sorbitan, glycerol, or pentaerythritol and a $C_8$-$C_{18}$ hydrocarbon.

The following paragraphs contain some discussion, which is illuminated by the innovations disclosed in this application, and any discussion of actual or proposed or possible approaches in this Background section does not imply that those approaches are prior art.

Natural resources such as oil and gas residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downwardly through the interior of the pipe and upwardly through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed. One example of a secondary cementing operation is squeeze cementing whereby a cement slurry is employed to plug and seal off undesirable flow passages in the cement sheath and/or the casing.

One problem commonly encountered during the placement of a cement slurry in a wellbore is unwanted gas migration from the subterranean formation into and through the cement slurry. Gas migration is caused by the behavior of the cement slurry during a transition phase in which the cement slurry changes from a true hydraulic fluid to a highly viscous mass showing some solid characteristics. When first placed in the annulus, the cement slurry acts as a true liquid and thus transmits hydrostatic pressure. However, during the transition phase, certain events occur that cause the cement slurry to lose its ability to transmit hydrostatic pressure. One of those events is the loss of fluid from the slurry to the subterranean zone. Another event is the development of static gel strength, i.e., stiffness, in the slurry. As a result, the pressure exerted on the formation by the cement slurry falls below the pressure of the gas in the formation such that the gas begins to migrate into and through the cement slurry. Eventually the gel strength of the cement slurry increases to a value sufficient to resist the pressure exerted by the gas in the formation against the slurry.

The flow channels formed in the cement during such gas migration undesirably remain in the cement once it has set. Those flow channels can permit further migration of fluid through the cement. Thus, the cement residing in the annulus may be ineffective at maintaining the isolation of the subterranean formation. As such, gas may undesirably leak to the surface or to other subterranean formations. An expensive remedial squeeze cementing operation may be required to prevent such leakage. However, the gas leakage may further cause high volume blow-outs shortly after cement replacement and before the cement has initially set.

In an effort to suppress gas migration, cement slurries have been designed that include metal particles such as an aluminum powder for generating a stabilized, dispersed gas. The gas is often generated in situ in a cement slurry by reacting the metal particles with an alkaline solution, e.g., the cement slurry, and/or water to yield hydrogen. A sufficient amount of gas is formed in the cement slurry to prevent the migration of gas into or through the slurry before it has sufficiently gelled to resist such migration.

The metal particles contained in the cement slurry are usually encapsulated with an inhibitor for delaying the hydrogen-generating reaction until a desired time such as after the slurry has been placed in its desired location in the wellbore, e.g., the annulus. Ideally, the inhibitor effectively inhibits the particles from interacting and reacting with oxygen, water vapor, and the cement slurry until gas generation is desired. Examples of chemical reaction inhibitors commonly used to encapsulate the reactant metal particles, particularly aluminum powder, are fatty acids of sorbitan, glycerol, and/or pentaerythritol such as sorbitan monooleate. Additional information relating to the use of metal particles to generate gas in cement slurries and/or inhibitors to retard the generation of the gas may be found in U.S. Pat. Nos. 5,718,292, 4,565,578, 4,450,010, 4,367,093, and 4,340,427, and in U.S. Patent Application Publication No. 2004/0221990 A1, each of which is incorporated herein by reference.

Unfortunately, metal particles coated with such inhibitors suffer from the drawback of undergoing severe sintering when they are not flowable such as when they are being stored. As used herein, "sintering" refers to the agglomeration of metal powders at temperatures below the melting point. Such sintering may be facilitated by the non-uniformity of the inhibitor coating, mechanical vibration of the particles such as when they are being transported, the compaction of the particles in a container, and/or the exposure of the particles to relatively high temperatures, air, oxygen, and/or moisture. As a result of such sintering, the metal particles are neither free flowing as before nor properly encapsulated with the inhibitor, making the particles extremely reactive. They may react with water vapor and release the hydrogen prematurely, or they may bond with oxygen to form metal oxides, precluding them from later forming hydrogen gas. The duration for which the particles can be stored without undergoing any changes in their physical (e.g., free flowing nature) or chemical properties, which is known as the shelf life of the particles, thus is often shorter than desired. A need therefore exists to develop an improved way of delaying the reaction of the metal particles and thereby improve the shelf life of such particles.

SUMMARY

Some teachings and advantages found in the present application are summarized briefly below. However, note that the present application may disclose multiple embodiments, and not all of the statements in this section necessarily relate to all of those embodiments. Moreover, none of these statements limit the claims in any way.

Gas-generating additives for use in a cement composition comprise: a gas-generating material at least partially encapsulated by a coating comprising a fatty acid ester of sorbitan, glycerol, or pentaerythritol and having a shelf life of about 12 months or greater. The coating may also include a $C_8$-$C_{18}$ hydrocarbon for increasing the shelf life of the gas-generating material. In an embodiment, the $C_8$-$C_{18}$ hydrocarbon primarily comprises an aliphatic hydrocarbon. The gas-generating additives may be used in cement compositions to generate gas therein after the compositions have been placed in a wellbore. The coating surrounding the gas-generating material serves to delay the reaction for producing the gas until desired. The gas may serve to inhibit gas migration from an adjacent subterranean formation into and through the cement composition before it sets into a hard mass.

Coating the gas-generating material can ensure that it can be stored for a relatively long period of time (e.g., up to 1 year or longer) without being concerned that it might experience sintering and thus loose its free flowing nature and react prematurely. Without being limited by theory, it is believed that the $C_8$-$C_{18}$ hydrocarbon acts as a thinner to dilute the fatty acid ester of sorbitan, glycerol, or pentaerythritol, thus providing for a more uniform coating of the gas-generating material with the mixture. The $C_8$-$C_{18}$ hydrocarbon is hydrophobic in nature. Thus, in some embodiments, it may enhance the ability of the coating to protect the gas-generating material from contacting water while it is being stored. However, it is understood that during the coating procedure, the whole mixture may reach temperatures higher than the ambient temperature due to mechanical reasons. Consequently, a portion of the $C_8$-$C_{18}$ hydrocarbon may evaporate depending upon its vaporization temperature (usually increases with increasing molecular weight i.e., from $C_8$ to $C_{18}$) and the temperature reached during coating, leaving the relatively uniform coating of the fatty acid ester of sorbitan, glycerol, or pentaerythritol to protect the gas-generating material.

DESCRIPTION OF THE PREFERRED EMBODIMENTS

Figure 1:
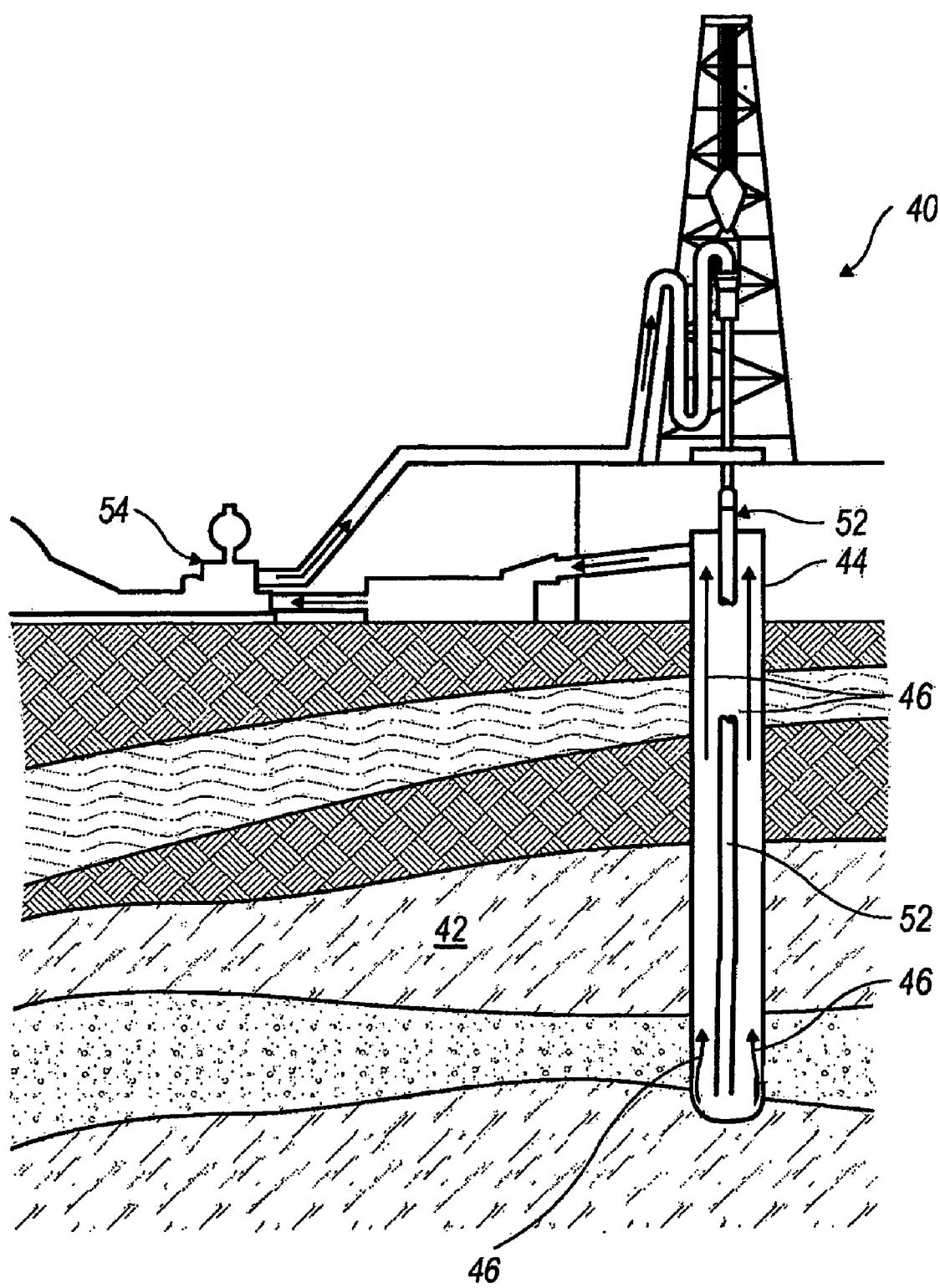
FIG. 1 depicts a side plan view of a drill rig and a wellbore for recovering oil or gas from a subterranean formation penetrated by the wellbore.

Gas-generating additives for use in cement compositions include a gas-generating material at least partially encapsulated with a coating comprising one or more fatty acid esters of sorbitan, glycerol, and/or pentaerythritol and initially one or more $C_8$-$C_{18}$ hydrocarbons for increasing the shelf life of the gas-generating material. The term "shelf life" is known in the art as meaning the duration for which the gas-generating material can be stored without undergoing any significant changes in either its physical (e.g., its free flowing nature) or chemical properties. In various embodiments, the shelf life may be increased to in a range of, for example, from greater than about 6 months to about 12 months. In other embodiments, the shelf life may be increased to 12 months or greater. Thus, the coated gas-generating material may be stored without losing its free flowing nature and its ability to generate gas until it is time to prepare the cement compositions. It is understood that during the coating procedure, the temperature of the whole coating mixture may exceed the ambient temperature due to mechanical reasons, e.g., grinding of the gas-generating particles. As a result, at least a portion of the $C_8$-$C_{18}$ evaporate due to its temperature reaching its vaporization temperature (usually increases with increasing molecular weight i.e., from $C_8$ to $C_{18}$) or higher during the coating procedure. Thus, only the relatively uniform coating of the fatty acid ester of sorbitan, glycerol, or pentaerythritol may remain to protect the gas-generating material.

The gas-generating additives may be included in cement compositions that also comprise cement and fluid. Various types of cements are known in the art and may be used in the cement compositions. The cement may be a hydraulic cement composed of calcium, aluminum, silicon, oxygen, and/or sulfur which sets and hardens by reaction with water. Examples of hydraulic cements include but are not limited to Portland cements, pozzolan cements, gypsum cements, high alumina content cements, silica cements, and high alkalinity cements. In some embodiments, the cement may be a class A, B, C, G, or H Portland cement. The cement compositions may also include a sufficient amount of fluid to form a pumpable cementitious slurry. Examples of suitable fluids include but are not limited to fresh water or salt water, e.g., an unsaturated aqueous salt solution or a saturated aqueous salt solution such as brine or seawater. In some embodiments, the water may be present in the cement compositions in an amount in the range of from about 33% to about 200% by weight of the cement (bwoc), alternatively from about 35% to about 60% bwoc.

The gas-generating material is desirably capable of generating gas such as hydrogen (H2) via a chemical reaction. In various embodiments, the gas-generating material may comprise one or more metals that react with aqueous alkaline solutions or water to produce hydrogen. Examples of suitable metals include but are not limited to aluminum, calcium, zinc, magnesium, lithium, sodium, potassium, and combinations thereof. In some embodiments, the hydrogen-generating material is an aluminum powder. Examples of suitable commercial aluminum powders include SUPER CBL powder and GAS CHECK powder, both of which are available from Halliburton Energy Services, Inc. (HES). The amount of the gas-generating material included in the cement composition may be selected based on the amount of gas production required to prevent formation gas from migrating from a subterranean formation into the cement composition while it is being placed in a wellbore. The amount of gas-generating material required to yield a specified volume percent of gas in the cement composition increases with pressure. For example, about 0.6% bwoc of an aluminum powder coated with the mixture described above is required to produce about 5% of hydrogen gas by volume of the cement composition in the case of an American Petroleum Institute (API) casing schedule of 6,000 feet. Further, about 1.10% bwoc of the coated aluminum powder is required to produce the same volumetric amount of hydrogen gas in the case of an API casing schedule of 14,000 feet. These comparisons are based upon the use of a neat cement slurry having an initial compressibility of 28 (µv/v)/atm.

The coating employed to encapsulate the gas-generating material may serve as an inhibitor that delays the release of the gas in the cement composition until a desired time. Otherwise, the reaction of the gas-generating material to produce gas may occur rapidly, causing the gas to be released prior to the desired time, for example, prior to placing the cement composition in the annulus of a wellbore. Moreover, hydrogen gas is highly explosive and thus its generation at inappropriate times may be dangerous. The coating may initially be formed to include from about 3% to about 10%, or alternatively from about 4% to about 5%, of the one or more fatty acid esters of sorbitan, glycerol, and/or pentaerythritol, all percentages being by weight of the gas-generating material. It may further initially include from about 0.25% to about 5%, or alternatively from about 1% to about 2%, of the one or more $C_8$-$C_{18}$ hydrocarbons, all percentages being by weight of the gas-generating material. Examples of suitable fatty acid esters of sorbitan, glycerol, and/or pentaerythritol include but are not limited to sorbitan monooleate (SMO), sorbitan monoricinoleate, sorbitan monotallate, sorbitan monoisostearate, sorbitan monostearate, sorbitan dioleate, sorbitan trioleate, glycerol monoricinoleate, glycerol monostearate, pentaerythritol monoricinoleate, and combinations thereof. Examples of suitable $C_8$-$C_{18}$ hydrocarbons include but are not limited to isoparaffins such as IA-35 synthetic isoparaffin and EXPAR M synthetic isoparaffin, which are commercially available from EXPO Chemical Company, Inc. of Houston, Tex.

The inhibitor optionally may also include an anti-oxidant to make the gas-generating material less susceptible to reaction with oxygen ($O_2$). Otherwise, the atoms of the gas-generating material might bond with oxygen atoms to form an oxide, limiting the ability of the gas-generating material to later react with the cement composition and produce gas downhole. The anti-oxidant may be, for example, butylhydroxytoluene (BHT), butylated hydroxyanisole (BHA) and tert-butylhydroquinone (TBHQ). The amount of the anti-oxidant present in the mixture for coating the gas-generating material may range from about 0.01% to about 2.0% by weight of the gas-generating material, or alternatively from about 0.01% to about 1%.

As deemed appropriate by one skilled in the art, additional additives may be added to the cement compositions for improving or changing the properties of the cement compositions. Examples of suitable additives include but are not limited to fluid loss control agents, weighting agents, defoamers, dispersing agents, set accelerators, and formation conditioning agents.

The gas-generating material may be prepared by first mixing together the components of the inhibitor, followed by coating the gas-generating material with the resulting liquid mixture. In some embodiments, the coating of the gas-generating material may be accomplished by mixing it with the liquid mixture such that it is thoroughly contacted and wetted with the mixture. In alternative embodiments, the liquid mixture may be sprayed onto the surface of the gas-generating material. As a result, the gas-generating material is entirely, or at least partially, coated with the mixture. The gas-generating material may be ground into a fine powder during this coating procedure. The coated gas-generating material may then be stored either off-site or on-site near where it is to later be used in a cement composition. The coating desirably prevents the gas-generating material from prematurely reacting while it is being stored and, if formed off-site, during its transport to the on-site location. When the time comes to form a cement composition, the coated gas-generating material may be dry blended with the cement, followed by mixing the resulting dry blend with water to form a pumpable cement slurry. Alternatively, the coated gas-generating material may be introduced to the mix water before it is combined with the cement to form a cement slurry.

FIG. 1 illustrates using a cement composition comprising the coated gas-generating material described herein. An oil rig 40 may be positioned near the surface of the earth 42 for later recovering oil from a subterranean formation (not shown). A wellbore 44 may be drilled in the earth 42 such that it penetrates the subterranean formation. A pipe 52, e.g., a casing, may extend down through wellbore 44 for delivering fluid to and/or from the wellbore. In a primary cementing process, the cement composition may be pumped down through pipe 52 and up through the annulus of wellbore 44 as indicated by arrows 46 using one or more pumps 54. The cement composition may be allowed to set within the annulus, thereby sealing wellbore 44. Any secondary cementing operations known in the art may also be performed using the cement composition. For example, a squeeze cementing technique may be employed to plug permeable areas or voids in the cement sheath or the pipe 52.

The inhibitor employed to coat the gas-generating material desirably delays the reaction by which the gas-generating material produces gas, e.g., hydrogen, until the cement composition has been placed in its desired location in the wellbore and before or during a transition time of the cement composition. The placement time of the cement slurry may vary with well depth, hole size, casing size, and placement rate. It is typically in the range of from about 15 minutes to about 300 minutes. In embodiments in which the gas-generating material is aluminum such as the finely ground SUPER CBL aluminum powder, the reaction by which it produces hydrogen relies on the alkalinity of the cement composition and generally proceeds according to the following reaction:

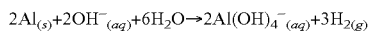
$$2Al_{(s)}+2OH^-_{(aq)}+6H_2O \rightarrow 2Al(OH)_4^-{}_{(aq)}+3H_{2(g)}$$

The particular reaction rate delay that results from coating the gas-generating material with the inhibitor depends on various factors, including the properties of the gas-generating material, the downhole conditions, the composition of the cement composition, and so forth. The reaction rate increases with increasing temperature and decreases with increasing pressure. The reaction may be delayed for an initial time period of from about 15 minutes to about 90 minutes during which the coating either slowly dissolves or the reactants undergo diffusion through the coating. The reaction rate then slowly increases to a peak reaction rate for a period of from about 30 minutes to about 300 minutes.

EXAMPLES

The invention having been generally described, the following examples are given as particular embodiments of the invention and to demonstrate the practice and advantages thereof. It is understood that the examples are given by way of illustration and are not intended to limit the specification or the claims to follow in any manner.

Example 1

A test sample was prepared by coating SUPER CBL aluminum powder with 4% SMO and 2% IA-35 isoparaffin by weight of the SUPER CBL aluminum powder. Its shelf life was accelerated to allow this example to be carried out in a short period of time. That is, the test sample was placed in a plastic cell, and that cell was then placed in a vibrating water bath. Subsequently, air saturated with water vapor was passed through the cell while the bath was maintained at a higher temperature of 120° F. Therefore, the four ingredients, i.e., water vapor, oxygen, heat, and mechanical energy, required to accelerate the aging process were provided. The test sample survived 5 weeks without becoming very reactive and still remains usable.

Example 2

A test sample was prepared by coating SUPER CBL aluminum powder with 4% SMO and 0.5% BHT by weight of the SUPER CBL aluminum powder. It was then tested in the same manner as the test sample in Example 1. This test sample also survived 5 weeks without becoming very reactive and still remains usable.

Comparative Example 1

A conventional control sample was prepared by coating SUPER CBL aluminum powder with 4% SMO by weight of the SUPER CBL aluminum powder. It was then tested in the same manner as the test sample in Example 1. This test sample became too reactive to remain usable after 3 weeks. The typical shelf life of a conventional SUPER CBL aluminum powder coated with 4% SMO is about 6 months when its aging process is not accelerated.

Based on the foregoing examples, using IA-35 isoparaffin or a BHT anti-oxidant in combination with the SMO forms a better coating for the aluminum powder by improving the shelf life of that powder. Therefore, an aluminum powder coated in this manner may serve as a very good gas-generating material in a cement composition.

In various embodiments, methods of cementing in a wellbore comprise: coating a gas-generating material with a mixture comprising a fatty acid ester of sorbitan, glycerol, or pentaerythritol and a $C_8$-$C_{18}$ hydrocarbon for increasing a shelf life of the gas-generating material; preparing a cement composition comprising the gas-generating material; introducing the cement composition into a wellbore; and allowing the cement composition to set.

In additional embodiments, methods of cementing in a wellbore comprise: coating a gas-generating material with a mixture comprising a fatty acid ester of sorbitan, glycerol, or pentaerythritol and a $C_8$-$C_{18}$ hydrocarbon, thereby delaying the generation of a gas; preparing a cement composition by combining a cement, a fluid for making the cement composition pumpable, and the gas-generating material; displacing the cement composition into the wellbore; allowing the gas-generating material to generate the gas within the cement composition; and allowing the cement composition to set.

According to various embodiments, gas-generating additives for use in a cement composition comprise: a gas-generating material at least partially encapsulated by a coating comprising a fatty acid ester of sorbitan, glycerol, or pentaerythritol and having a shelf life of about 12 months or greater. In more embodiments, cement compositions comprise: a gas-generating material at least partially coated with a mixture comprising a fatty acid ester of sorbitan, glycerol, or pentaerythritol and a $C_8$-$C_{18}$ hydrocarbon for increasing a shelf life of the gas-generating material. In yet more embodiments, cement compositions comprise: a cement; a fluid for making the cement composition pumpable; a hydrogen-generating material at least partially coated with a mixture for delaying a hydrogen-generating reaction, the mixture comprising sorbitan monooleate and an isoparaffin.

Modifications and Variations

The foregoing methods of cementing a wellbore may be applied to various types of wells, including injection wells, single production wells such as oil and gas wells, and multiple completion wells.

While preferred embodiments of the invention have been shown and described, modifications thereof can be made by one skilled in the art without departing from the spirit and teachings of the invention. The embodiments described herein are exemplary only, and are not intended to be limiting.

Many variations and modifications of the invention disclosed herein are possible and are within the scope of the invention.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A gas-generating additive for use in a cement composition, comprising: a gas-generating material at least partially encapsulated by a coating comprising a fatty acid ester of sorbitan, glycerol, or pentaerythritol and a C8-18 hydrocarbon in an amount of about 0.25% to about 5% by weight of the gas-generating material.

2. The gas-generating additive of claim 1, wherein the gas-generating material comprises an aluminum powder.

3. The gas-generating additive of claim 1, wherein the gas-generating additive has a shelf life of about 12 months or greater.

4. The gas-generating additive of claim 1, wherein the fatty acid ester of sorbitan, glycerol, or pentaerythritol comprises sorbitan monooleate, sorbitan monoricinoleate, sorbitan monotallate, sorbitan monoisostearate, sorbitan monostearate, sorbitan dioleate, sorbitan trioleate, glycerol monoricinoleate, glycerol monostearate, pentaerythritol monoricinoleate, or combinations thereof.

5. The gas-generating additive of claim 1, wherein the gas-generating additive comprises the fatty acid ester in an amount of about 3% to about 10% by weight of the gas-generating material.

6. The gas-generating additive of claim 1, wherein the C8-18 hydrocarbon comprises an isoparaffin.

7. The gas-generating additive of claim 1, wherein the coating further comprises an anti-oxidant.

8. A gas-generating additive for use in a cement composition, comprising: aluminum powder at least partially encapsulated by a coating comprising a fatty acid ester of sorbitan, glycerol, or pentaerythritol in an amount of about 3% to about 10% by weight of the aluminum power and an isoparaffin in an amount of about 0.25% to about 5% by weight of the aluminum powder.

9. A gas-generating additive for use in a cement composition, comprising: a gas-generating material at least partially encapsulated by a coating comprising a C8-18 hydrocarbon, wherein the coating further comprises a fatty acid ester of sorbitan, glycerol, or pentaerythritol.

10. The gas-generating additive of claim 9, wherein the gas-generating material comprises a hydrogen-generating material.

11. The gas-generating additive of claim 9, wherein the gas-generating material comprises aluminum, calcium, zinc, magnesium, lithium, sodium, potassium, or combinations thereof.

12. The gas-generating additive of claim 9, wherein the gas-generating material comprises an aluminum powder.

13. The gas-generating additive of claim 9, wherein the shelf life is about 12 months or greater.

14. The gas-generating additive of claim 9, wherein the shelf life is in a range of from greater than about 6 months to about 12 months.

15. The gas-generating additive of claim 9, wherein the gas-generating additive comprises the fatty acid ester in an amount of about 3% to about 10% by weight of the gas-generating material.

16. The gas-generating additive of claim 9, wherein the C8-18 hydrocarbon comprises an isoparaffin.

17. The gas-generating additive of claim 9, wherein the coating further comprises an anti-oxidant.

18. The gas-generating additive of claim 1 wherein the gas-generating material comprises a hydrogen-generating material and the coating comprises sorbitan monooleate and an isoparaffin.

* * * * *